United States Patent Office 3,346,977
Patented Oct. 17, 1967

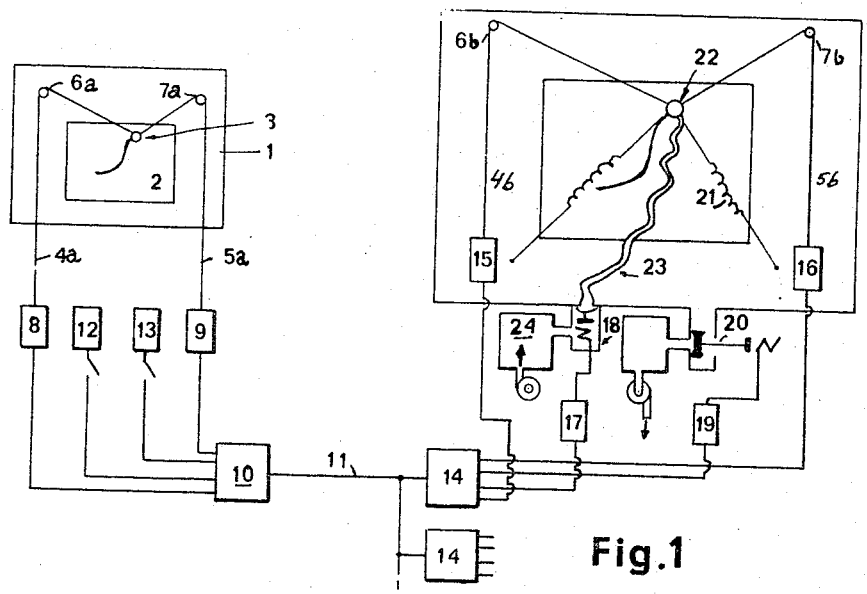
Fig.1
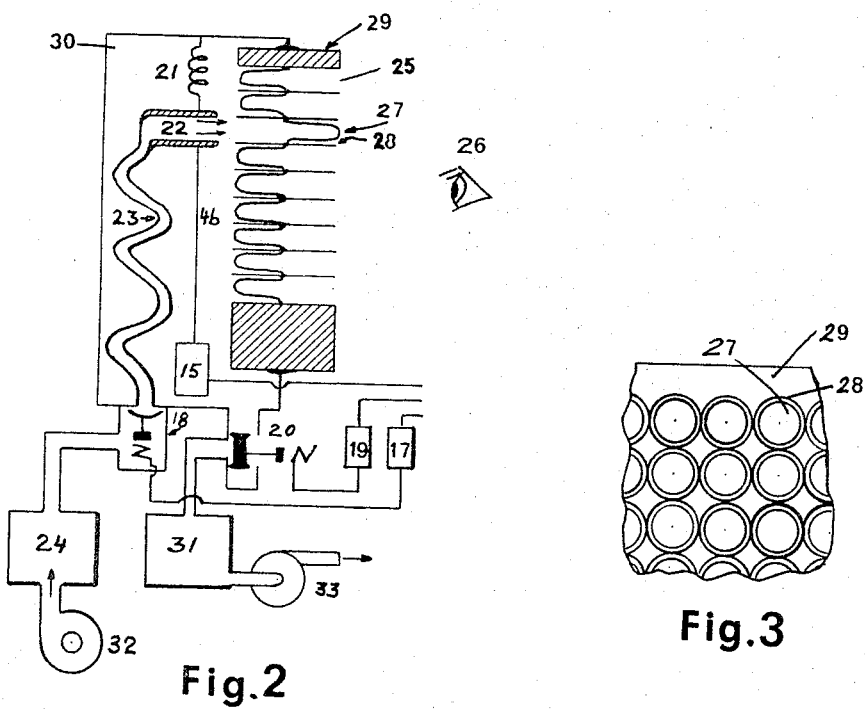
Fig.2
Fig.3

3,346,977
IMAGE REPRODUCING DEVICE
Hans Fredrik Rydström, Hognasvagen 17,
Lidingo 1, Sweden
Filed Apr. 24, 1964, Ser. No. 362,347
Claims priority, application Sweden, Apr. 26, 1963,
4,575/63
1 Claim. (Cl. 40—28)

The present invention relates to an image reproducing device for remotely controlled presentation of an image as well as a remote erasing of the image thus reproduced.

More particularly, a device according to the invention belongs to the kind of image presentation devices comprising in combination a contrast screen having a front surface defined by apertures of recesses arranged in a mosaic pattern and comprising in each of said recesses a pressure sensitive, pneumatically actuated contrast means, each of said contrast means comprising a movable non-black contrast element arranged so as to be able to be moved into two different positions, a first position, the bright position, in which said contrast element is located adjacent the screen surface and is visible at said front surface, and a second position, the dark position, in which said contrast element is more remote from the screen surface and essentially invisible at the front surface, and means for controllably bringing each individual contrast means pneumatically from one of said positions to the other and vice versa.

In a simple embodiment the contrast means consists of a brightly coloured elastic bellows, which is airtight secured in a tubular, open ended recess, said recess having dark walls. The bellows is tightly secured along a rim thereof to the internal walls of the recess and so arranged that it may, when exposed to an air pressure difference on opposite sides of the bellows wall, occupy two different stable positions, one of which being the "bright position" mentioned above and the other being said "dark position," an end wall of the bellows in the bright position being located adjacent the front aperture of the recess and thus being visible in the aperture, and in the dark position located at position remote from the recess aperture and thus essentially invisible from the front side of the screen. In the bright position a contrast means of the kind described thus shows part of its bright surface in the otherwise dark recess aperture, which faces towards a spectator, whereas, with the bellows in the dark position, the bright surface thereof is withdrawn into the dark aperture, where it will be essentially invisible to the spectator. An image of a desired pattern may thus be obtained by bringing selected contrast means to said first stable position, the bright position, under the control of a pneumatic pressure, individually actuating the contrast means, which will then stay in this position until, by means of a pressure in opposite direction, the contrast means are brought into their second stable position, the dark position.

According to the invention said pneumatic means for bringing the contrast means occupying the dark position individually into the bright position consists of a movable actuating member, said member comprising means for directing an air jet against the rear side of a contrast means for bringing the contrast means from said second, dark position to said first, bright position, means for controlling said air jet, means for moving said actuating member along a plurality of contrast means and means for actuating said air jet control means in dependence of a predetermined pattern.

As is the case with other means well known to the art for creating an image on an image presentation screen in dependence of a predetermined pattern, the scanning means according to the invention are preferably arranged so as to give a reproduction by an image, the elements of which are arranged in columns, the element of each column being arranged so as to give a pattern constituted by elements in mutually parallel rows and columns.

The invention will be more evident from the following description of embodiments thereof taken with the attached drawing, wherein:

FIG. 1 is a general schematic presentation of an embodiment of the invention with a transmitter for generating control signals to operate the contrast means of an image presentation screen, although it may be understood that the means for selectively actuating the different contrast means in order to create an image of an original pattern may be arranged in any manner, FIG. 2 illustrates an embodiment of a scanning means for scanning a column of an image screen. FIG. 3 is a detail of an image screen as seen from the front side of the screen.

In FIG. 1, 1 is a transmitter for generating control signals corresponding to a pattern that shall be reproduced by means of a device according to the invention. The invention is described in connection with FIG. 1 in general principle and it is to be understood that control signals for actuating individual contrast means of a reproduction mosaic arrangement according to the invention may be generated in any conceivable manner well known to the art for purposes of switching elements of a screen in order to reproduce a selected pattern or generating signals which selectively actuate means located on a reproduction screen in accordance with corresponding elements of a scanned pattern.

The transmitter comprises a scanning table 1 onto which an original pattern 2 to be scanned is arranged. A transmitter stylus 3 is connected to two coordinate signal generators, comprising wires 4a, 5a running via rollers 6a and 7a, respectively, to two coordinate calculators 8 and 9 respectively, which, in a manner well known per se in the art, generate signals representative for the location of the stylus. Said signals, which are thus representative for the coordinates of the stylus, are transferred by a signal transfer device 10 via a transmission channel 11 to one or more receiving means, each comprising an image reproducing device according to the invention. Further, the transmitter comprises a contrast signal generator 12 and an erasing signal generator 13, said signal generators by means of individual switches 12a and 13a, respectively, being connected to said signal transfer device 10. Said signals, namely two coordinate determining signals, a contrast signal and an erasing signal may, for instance, be constituted by signals located within different frequency ranges, in which case the signal transfer device 10 may be a frequency signal mixer, the receiver or each of the receivers comprising as input circuit a signal separator 14, having output terminals for said four signals.

The coordinate signals generated by the coordinate signal generators 8 and 9, respectively, constitute input signals to each slave servo system 15 and 16, respectively, of which only one is illustrated in FIG. 2, and which by means of wires 4b and 5b, respectively, and guide wheels 6b and 7b, respectively, control the position of a nozzle 22 for pressurized air, acting as a "stylus" in the receiver. Tension springs 21 keep the wires 4b and 5b, respectively, tensioned.

The contrast signal mentioned above actuates a contrast signal receiver 17, arranged so as to actuate a magnetically controlled valve 18, hereinafter called the contrast valve. The erasing signal mentioned above actuates an erasing signal receiver 19, arranged so as to actuate a magnetically controlled switch-over valve 20, hereinafter called the erasing valve.

The air nozzle 22 is, by means of a hose 23, connected to a source 24 of pressurized air via contrast valve 18.

Nozzle 22 is movable in a plane parallel to an image screen consisting of a plurality of contrast means 25, visible from its front side to a spectator 26.

Each contrast means 25 comprises an elastic bellows 27, which, in the embodiment as illustrated in FIG. 2, has a bright coloured front surface and is arranged in a dark recess. Each one of said recesses 28 extends all way through a wall 29, which is dark on the side facing a spectator 26. Said contrast means 25 constitute wall elements of a chamber 30, which is connectable by means of the erasing valve 20 either to the open air or to a source 31 of a pressure below atmospheric pressure. The source of pressure air comprises a compressor or fan 32 and the source of pressure below atmospheric a suction pump or fan 33.

The device functions in the following manner: In rest position all contrast means 25 are in the dark position, in which the pressure sensitive members of said means, the elastic bellows 27, are all retracted into the dark recesses 28, in which position the bellows do not in any essential degree reflect light entering into the recess from outside back to the eyes of a spectator. A spectator will thus see the contrast screen as an essentially dark surface as long as all contrast means are in the "dark position."

If now the transmitter stylus 3 is moved in dependence of a pattern determined by the original figure to be reproduced, the air jet nozzle 22 will follow the movements of stylus 3 under the control of the means above described. If, during this movement, a signal is obtained from the contrast signal transmitter 12, this signal actuates contrast valve 18, so that a jet of pressurized air will leave the nozzle 22, this jet bringing the contrast members of the contrast means in front of the nozzle 22 from said second, "dark" position to said first, "bright" position. The base of the nozzle 22 will thus leave a bright line in accordance with the line of the original picture 2, which has been followed by the scanning stylus. When the stylus 3 is to be moved from a part of the original picture to another part thereof without leaving a trace on the reproduction screen, as for instance if a pencil shall be brought from the end of one letter to the location of the beginning of a next letter, the contrast signal transmitter 12 is switched off, whereafter the stylus 3 is brought to the desired position for the new start. As soon as the contrast signal, and thus also the control signal to the contrast valve 18 disappears, valve 18 closes, thus shutting off the air jet from nozzle 22, whereby the contrast means bypassed by the nozzle are then not actuated.

Due to the fact that, in this embodiment, the bright position as well as the dark one are mechanically stable ones, the picture remains on the contrast screen as long as the air pressure of chamber 30 does not essentially deviate from the pressure outside the screen.

To erase an image thus reproduced, the erasing signal generator 13 is switched on, the generator then delivering an erasing signal, which, via signal mixer 10, channel 11 and signal separator 14, actuates the erasing signal receiver 19, the output signal of which actuates a magnet coil of erasing valve 20, this valve then closing the connection between chamber 30 and the surrounding air and opening the connection between the chamber and the source 31 of sub-pressure. Thus the pressure in chamber 30 decreases, causing all those contrast elements which have earlier been brought in their bright position, to switch over to their dark position.

The sub-pressure source 31 is, preferably, kept at a level, which is well below the value at which the contrast means switch over from the light to the dark position, but not so much below this pressure as to expose the contrast means to excessive stress.

Obviously, it is also possible to arrange for a representation of a pattern in black against a bright background, in which case the contrast means are normally brought to their bright position if no representation of an image is present, and brought to their black position in dependence of a pattern to be represented. In this case the contrast members are either exposed to a jet from the side of the screen facing the spectator or exposed to a vacuum on the rear side of the contrast member, in which case it will either be necessary to have individual control valves for each contrast means or to arrange a suction nozzle corresponding to jet nozzle 22, so as to scan the rear apertures of the contrast means without great leakage of air.

I claim:

Image reproducing device for remotely controlled presentation of an image comprising in combination a contrast screen having a front surface defined by apertures of recesses arranged in a mosaic pattern and comprising in each of said recesses at least one pressure sensitive contrast means, each of said contrast means comprising a movable non-black contrast element arranged so as to be moved into two different positions, a first position, the bright position, in which said contrast element is located adjacent the screen surface and is visible at said front surface, and a second position, the dark position, in which said contrast element is more remote from the screen surface than in said first position and essentially invisible at the front surface, and means for the controllable application of a pressure on each individual contrast means for bringing said contrast element from one of said positions to the other and vice versa, comprising a source of pressurized air, an air nozzle for generating an air jet, a valve for controlling air flow from said source of pressurized air to said nozzle, means for moving said nozzle in a scanning movement at the rear side of said screen for controllably directing an air jet at the rear of said apertures of said recesses in order to bring said contrast elements from said second position into said first position, and means for controllably exposing said rear apertures of said recesses to a vacuum in order to bring said contrast element from said first position into said second position.

References Cited

UNITED STATES PATENTS

| 1,171,397 | 2/1916 | Brady | 40—28 |
| 3,091,876 | 6/1963 | Cole | 40—28 |
| 3,106,794 | 10/1963 | Le Goff | 40—28 |

EUGENE R. CAPOZIO, *Primary Examiner.*

W. J. CONTRERAS, *Assistant Examiner.*